United States Patent
Aase et al.

(10) Patent No.: US 9,640,967 B2
(45) Date of Patent: May 2, 2017

(54) METHOD FOR MOLDING A CABLE STRUCTURE

(71) Applicant: Apple Inc., Cupertino, CA (US)

(72) Inventors: Jonathan S. Aase, Redwood City, CA (US); Cameron P. Frazier, Chicago, IL (US); John E. Thomas, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 313 days.

(21) Appl. No.: 14/059,238

(22) Filed: Oct. 21, 2013

(65) Prior Publication Data

US 2014/0110882 A1 Apr. 24, 2014

Related U.S. Application Data

(63) Continuation of application No. 13/013,557, filed on Jan. 25, 2011, now Pat. No. 8,562,890.

(Continued)

(51) Int. Cl.
*B29C 45/14* (2006.01)
*H02G 15/18* (2006.01)
(Continued)

(52) U.S. Cl.
CPC ............ *H02G 15/18* (2013.01); *B29C 39/42* (2013.01); *B29C 43/18* (2013.01); *B29C 43/203* (2013.01);
(Continued)

(58) Field of Classification Search
None
See application file for complete search history.

(56) References Cited

U.S. PATENT DOCUMENTS 2,465,799 A * 3/1949 Gravesen .......... B29C 45/14073
264/254
2,937,228 A 5/1960 Robinson
(Continued)

FOREIGN PATENT DOCUMENTS

DE 1729357 7/1971
JP 2001-096569 4/2001
(Continued)

OTHER PUBLICATIONS

Notice of Allowance for U.S. Appl. No. 13/077,027, mailed Jan. 16, 2013, 13 pages.

*Primary Examiner* — Edmund Lee
(74) *Attorney, Agent, or Firm* — Van Court & Aldridge LLP

(57) ABSTRACT

A headset can include a cable structure connecting non-cable components such as jacks and headphones. The cable structure can be constructed using a molding process. Different approaches can be used to ensure that a conductor bundle extending through the cable structure remains centered within the cable structure during the molding process. A movable tube can be placed in the mold such that the conductor bundle is retained within the tube. As material is injected into the mold and reaches the tube, the tube can be displaced and progressively removed from the mold. Alternatively, the movable tube can be constructed such that the tube may combine with injected material to form a shell of the cable structure. Gates from which material is provided in the mold can be positioned and controlled to facilitate the injection of material in the mold while maintaining the centered position of the conductor bundle.

26 Claims, 12 Drawing Sheets

Related U.S. Application Data

(60) Provisional application No. 61/384,097, filed on Sep. 17, 2010, provisional application No. 61/384,103, filed on Sep. 17, 2010, provisional application No. 61/378,314, filed on Aug. 30, 2010, provisional application No. 61/378,311, filed on Aug. 30, 2010, provisional application No. 61/349,768, filed on May 28, 2010, provisional application No. 61/326,102, filed on Apr. 20, 2010, provisional application No. 61/319,772, filed on Mar. 31, 2010, provisional application No. 61/298,087, filed on Jan. 25, 2010.

(51) Int. Cl.

| | | |
|---|---|---|
| *B29C 39/42* | (2006.01) | |
| *B29C 43/18* | (2006.01) | |
| *B29C 43/20* | (2006.01) | |
| *B29C 43/36* | (2006.01) | |
| B29C 33/10 | (2006.01) | |
| B29K 105/00 | (2006.01) | |
| B29K 705/00 | (2006.01) | |
| B29L 31/34 | (2006.01) | |

(52) U.S. Cl.
CPC ........ *B29C 43/36* (2013.01); *B29C 45/14073* (2013.01); *B29C 33/10* (2013.01); *B29C 2043/3605* (2013.01); *B29C 2043/3621* (2013.01); *B29C 2043/3665* (2013.01); *B29C 2045/1409* (2013.01); *B29C 2045/14131* (2013.01); *B29K 2105/256* (2013.01); *B29K 2705/00* (2013.01); *B29L 2031/3462* (2013.01)

(56) References Cited

U.S. PATENT DOCUMENTS

| | | | |
|---|---|---|---|
| 3,151,211 A | | 9/1964 | Reid et al. |
| 3,178,770 A | | 4/1965 | Willis |
| 3,311,690 A | * | 3/1967 | Fischer ............. B29C 45/14073 264/278 |
| D214,906 S | | 8/1969 | Steinmeyer |
| 3,778,211 A | | 12/1973 | Moen et al. |
| 3,845,414 A | | 10/1974 | McKenzie |
| 3,910,743 A | | 10/1975 | Farrell |
| 3,928,519 A | | 12/1975 | Kashiyama et al. |
| 4,094,688 A | | 6/1978 | Wolf |
| 4,110,394 A | | 8/1978 | Shimada et al. |
| 4,217,465 A | | 8/1980 | Holden |
| 4,385,203 A | | 5/1983 | Faranetta et al. |
| 4,467,002 A | | 8/1984 | Crofts |
| 4,646,872 A | | 3/1987 | Kamon et al. |
| 4,822,956 A | | 4/1989 | Sepe |
| 4,849,582 A | | 7/1989 | Stevenson |
| 4,879,807 A | | 11/1989 | Roucaute |
| 4,923,537 A | | 5/1990 | Matsushima |
| 4,924,037 A | | 5/1990 | Ainsworth et al. |
| 5,021,611 A | | 6/1991 | Amano |
| 5,082,253 A | | 1/1992 | Suzuki et al. |
| 5,113,039 A | | 5/1992 | Guipe et al. |
| 5,168,124 A | | 12/1992 | Takase et al. |
| 5,182,032 A | * | 1/1993 | Dickie ............. B29C 45/14639 249/91 |
| 5,283,392 A | | 2/1994 | Ooshima et al. |
| 5,397,860 A | | 3/1995 | Yochum et al. |
| 5,563,376 A | | 10/1996 | Hansell et al. |
| 5,685,884 A | * | 11/1997 | Van Den Berg ........ G01P 1/026 264/265 |
| 5,827,440 A | * | 10/1998 | Furuya ................. B29C 33/123 249/91 |
| 5,917,151 A | | 6/1999 | O'Brien et al. |
| 5,917,155 A | | 6/1999 | Hake et al. |
| 5,972,270 A | * | 10/1999 | Furuya ................. B29C 33/123 249/91 |
| 6,050,847 A | | 4/2000 | Kawakami et al. |
| 6,063,321 A | * | 5/2000 | Koyama ........... B29C 45/14073 264/272.15 |
| 6,291,770 B1 | | 9/2001 | Casperson |
| 6,392,155 B1 | | 5/2002 | Shimizu et al. |
| 6,439,933 B1 | | 8/2002 | Moji |
| 6,576,841 B1 | | 6/2003 | Brannan et al. |
| 6,644,117 B1 | | 11/2003 | Kueck et al. |
| D526,642 S | | 8/2006 | Choe |
| 7,288,000 B2 | | 10/2007 | Liu et al. |
| 7,314,999 B2 | | 1/2008 | Dobler |
| 7,569,171 B2 | * | 8/2009 | Dieudonat ........ B29C 45/14073 264/275 |
| D605,628 S | | 12/2009 | Ando |
| 7,853,302 B2 | | 12/2010 | Rodriguez et al. |
| 7,899,548 B2 | | 3/2011 | Barker |
| 7,908,742 B2 | | 3/2011 | Bedoe et al. |
| 8,126,557 B2 | | 2/2012 | Jang et al. |
| 8,162,697 B1 | | 4/2012 | Menolotto et al. |
| 8,182,293 B2 | | 5/2012 | Tang et al. |
| 8,206,181 B2 | | 6/2012 | Steijner |
| 8,235,756 B2 | | 8/2012 | Stiehl |
| 8,249,286 B2 | | 8/2012 | Nault |
| 8,267,727 B2 | | 9/2012 | Lynch et al. |
| 8,287,315 B2 | | 10/2012 | Montena |
| 8,308,505 B2 | | 11/2012 | Hatton et al. |
| 8,363,873 B2 | | 1/2013 | Liu et al. |
| 8,562,890 B2 | | 10/2013 | Aase et al. |
| 2002/0017392 A1 | | 2/2002 | Efraimsson et al. |
| 2006/0169473 A1 | | 8/2006 | Dobler |
| 2007/0020989 A1 | | 1/2007 | Liu et al. |
| 2010/0104126 A1 | | 4/2010 | Greene |
| 2011/0044487 A1 | | 2/2011 | Nault |
| 2011/0051973 A1 | | 3/2011 | Liu et al. |
| 2011/0136375 A1 | | 6/2011 | Hatton et al. |
| 2011/0162883 A1 | | 7/2011 | Groset et al. |
| 2011/0180302 A1 | | 7/2011 | Aase et al. |
| 2011/0180303 A1 | | 7/2011 | Aase et al. |
| 2011/0180321 A1 | | 7/2011 | Aase et al. |
| 2011/0182459 A1 | | 7/2011 | Aase et al. |
| 2011/0182460 A1 | | 7/2011 | Aase et al. |
| 2011/0243346 A1 | | 10/2011 | Aase et al. |
| 2011/0243360 A1 | | 10/2011 | Aase |
| 2011/0256779 A1 | | 10/2011 | Aase |

FOREIGN PATENT DOCUMENTS

| | | |
|---|---|---|
| JP | 2002-367751 | 12/2002 |
| JP | 2005-199482 | 7/2005 |

* cited by examiner

METHOD FOR MOLDING A CABLE STRUCTURE

CROSS-REFERENCE TO RELATED APPLICATION

This application is a continuation of U.S. patent application Ser. No. 13/013,557, filed Jan. 25, 2011 now U.S. Pat. No. 8,562,890, which claims the benefit of U.S. Provisional Patent Application No. 61/298,087, filed Jan. 25, 2010, U.S. Provisional Patent Application No. 61/384,103, filed Sep. 17, 2010, U.S. Provisional Patent Application No. 61/319,772, filed Mar. 31, 2010, U.S. Provisional Patent Application No. 61/384,097, filed Sep. 17, 2010, U.S. Provisional Patent Application No. 61/326,102, filed Apr. 20, 2010, U.S. Provisional Patent Application No. 61/349,768, filed May 28, 2010, U.S. Provisional Patent Application No. 61/378,311, filed Aug. 30, 2010, and U.S. Provisional Application No. 61/378,314, filed Aug. 30, 2010. Each of these earlier applications is incorporated by reference herein in its entirety.

BACKGROUND OF THE INVENTION

Wired headsets are commonly used with many portable electronic devices such as portable music players and mobile phones. Headsets can include non-cable components such as a jack, headphones, and/or a microphone and one or more cables that interconnect the non-cable components. The one or more cables can be manufactured using different approaches.

SUMMARY OF THE INVENTION

Molded multi-segment cable structures and systems and methods for molding cable structures are provided. In particular, systems and methods for maintaining a conductor bundle centered within a molded multi-segment cable structure are provided.

A cable structure can interconnect various non-cable components of a headset such as, for example, a plug, headphones, and/or a communications box to provide a headset. The cable structure can include several legs (e.g., a main leg, a left leg, and a right leg) that each connect to a non-cable structure, and each leg may be connected to one another at a bifurcation region (e.g., a region where the main leg appears to split into the left and right legs). Cable structures according to embodiments of this invention can include a conductor bundle to provide a conductive path between the non-cable components of the cable structure To provide an aesthetically pleasing cable structure, material can be molded over the conductor bundle. The mold can ensure a smooth and continuous outer surface for the cable structure. To mold a cable structure, a conductor bundle can initially be provided substantially at a centerline of the mold, and material can subsequently be injected into the mold. The pressure at which the material is injected, however, can cause the conductor bundle to be displaced from the centerline of the mold.

Different approaches can be used to maintain a conductor bundle centered within a mold. In some cases, a movable tube can be placed in the mold such that the conductor bundle is retained within the tube. As material is injected into the mold and reaches the tube, the tube can be displaced and progressively removed from the mold. The tube can translate within the mold under the control of an actuator, due to pressure from injected material, or combinations of these. Alternatively, the movable tube can be constructed such that the tube may combine with injected material to form a shell of the cable structure. In some cases, gates from which material is provided in the mold can be positioned and controlled (e.g., opened to allow different amounts of material) to facilitate the injection of material in the mold while maintaining the centered position of the conductor bundle.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1A:
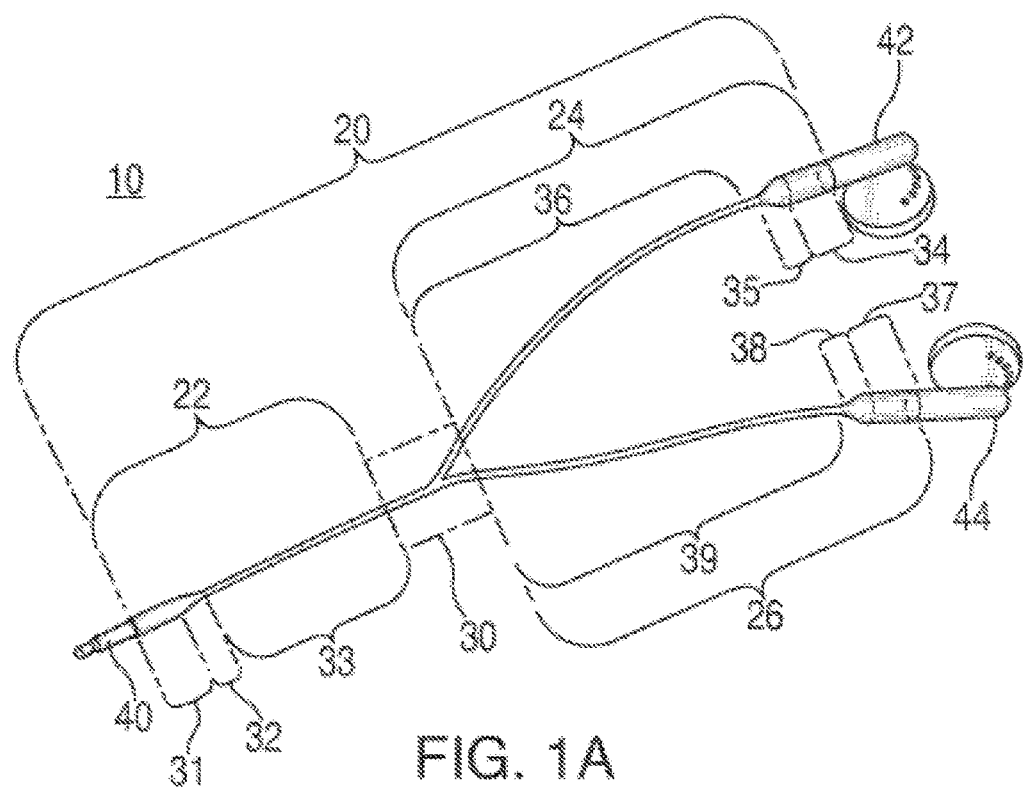
FIGS. 1A and 1B illustrate different headsets having a cable structure that seamlessly integrates with non-cable components in accordance with some embodiments of the invention.

Cable structures for use in headsets are disclosed. The cable structure interconnects various non-cable components of a headset such as, for example, a plug, headphones, and/or a communications box to provide a headset. The cable structure can include multiple legs (e.g., a main leg, a left leg, and a right leg) that each connect to a non-cable component, and each leg may be connected to each other at a bifurcation region (e.g., a region where the main leg appears to split into the left and right legs). Cable structures according to embodiments of this invention provide aesthetically pleasing interface connections between the non-cable components and legs of the cable structure. The interface connections between a leg and a non-cable component are such that they appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another is accomplished in a manner that maintains the spirit of the seamless interface connection between a leg and the non-cable component throughout the length of the leg. That is, each leg of the cable structure exhibits a substantially smooth surface, including the portion of the leg having a varying diameter. In some embodiments, the portion of the leg varying in diameter may be represented mathematically by a bump function, which requires all aspects of the variable diameter transition to be smooth. In other words, a cross-section of the variable diameter portion can show a curve or a curve profile.

The interconnection of the three legs at the bifurcation region can vary depending on how the cable structure is manufactured. In one approach, the cable structure can be a single-segment unibody cable structure or a jointly formed multi-leg cable structure. In this approach, all three legs are jointly formed and no additional processing is required to electrically couple the conductors contained therein. Construction of the single-segment cable may be such that the bifurcation region does not require any additional support. If additional support is required, an over-mold can be used to add strain relief to the bifurcation region.

In another approach, the cable structure can be a multi-segment unibody cable structure or a cable structure having three discrete or independently formed legs that are connected at a bifurcation region. In this approach, the legs may be manufactured as discrete segments, but require additional processing to electrically couple conductors contained therein. The segments can be joined together using a splitter. Many different splitter configurations can be used, and the use of some splitters may be based on the manufacturing process used to create the segment.

The cable structure can include a conductor bundle that extends through some or all of the legs. The conductor bundle can include conductors that interconnect various non-cable components. The conductor bundle can also include one or more rods constructed from a superelastic material. The superelastic rods can resist deformation to reduce or prevent tangling of the legs.

The cable structure can be constructed using many different manufacturing processes. The processes include injection molding, compression molding, and extrusion. In injection molding processes (e.g., liquid injection molding, or LIM), a mold is formed around a conductor bundle or a removable rod. The rod is removed after the mold is formed and a conductor bundle is threaded through the cavity.

FIG. 1A shows an illustrative headset 10 having cable structure 20 that seamlessly integrates with non-cable components 40, 42, and 44. For example, non-cable components 40, 42, and 44 can be a male plug, left headphones, and right headphones, respectively. Cable structure 20 has three legs 22, 24, and 26 joined together at bifurcation region 30. Leg 22 may be referred to herein as main leg 22, and includes the portion of cable structure 20 existing between non-cable component 40 and bifurcation region 30. In particular, main leg 22 includes interface region 31, bump region 32, and non-interface region 33. Leg 24 may be referred to herein as left leg 24, and includes the portion of cable structure 20 existing between non-cable component 42 and bifurcation region 30. Leg 26 may be referred to herein as right leg 26, and includes the portion of cable structure 20 existing between non-cable component 44 and bifurcation region 30. Both left and right legs 24 and 26 include respective interface regions 34 and 37, bump regions 35 and 38, and non-interface regions 36 and 39.

Legs 22, 24, and 26 generally exhibit a smooth surface throughout the entirety of their respective lengths. Each of legs 22, 24, and 26 can vary in diameter, yet still retain the smooth surface.

Non-interface regions 33, 36, and 39 can each have a predetermined diameter and length. The diameter of non-interface region 33 (of main leg 22) may be larger than or the same as the diameters of non-interface regions 36 and 39 (of left leg 24 and right leg 26, respectively). For example, leg 22 may contain a conductor bundle for both left and right legs 24 and 26 and may therefore require a greater diameter to accommodate all conductors. In some embodiments, it is desirable to manufacture non-interface regions 33, 36, and 39 to have the smallest diameter possible, for aesthetic reasons. As a result, the diameter of non-interface regions 33, 36, and 39 can be smaller than the diameter of any non-cable component (e.g., non-cable components 40, 42, and 44) physically connected to the interfacing region. Since it is desirable for cable structure 20 to seamlessly integrate with the non-cable components, the legs may vary in diameter from the non-interfacing region to the interfacing region.

Bump regions 32, 35, and 38 provide a diameter changing transition between interfacing regions 31, 34, and 37 and respective non-interfacing regions 33, 36, and 39. The diameter changing transition can take any suitable shape that exhibits a fluid or smooth transition from any interface region to its respective non-interface region. For example, the shape of the bump region can be similar to that of a cone or a neck of a wine bottle. As another example, the shape of the taper region can be stepless (i.e., there is no abrupt or dramatic step change in diameter, or no sharp angle at an end of the bump region). Bump regions 32, 35, and 38 may be mathematically represented by a bump function, which requires the entire diameter changing transition to be stepless and smooth (e.g., the bump function is continuously differentiable).

Figure 1B:
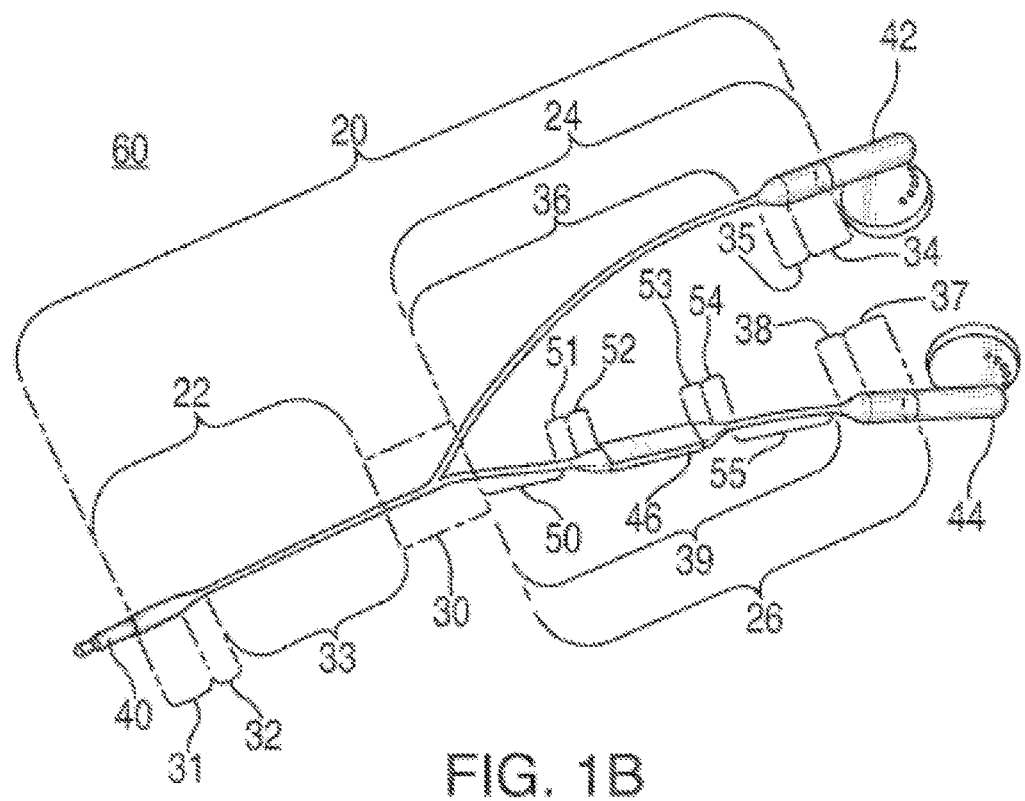
Figure 1C:
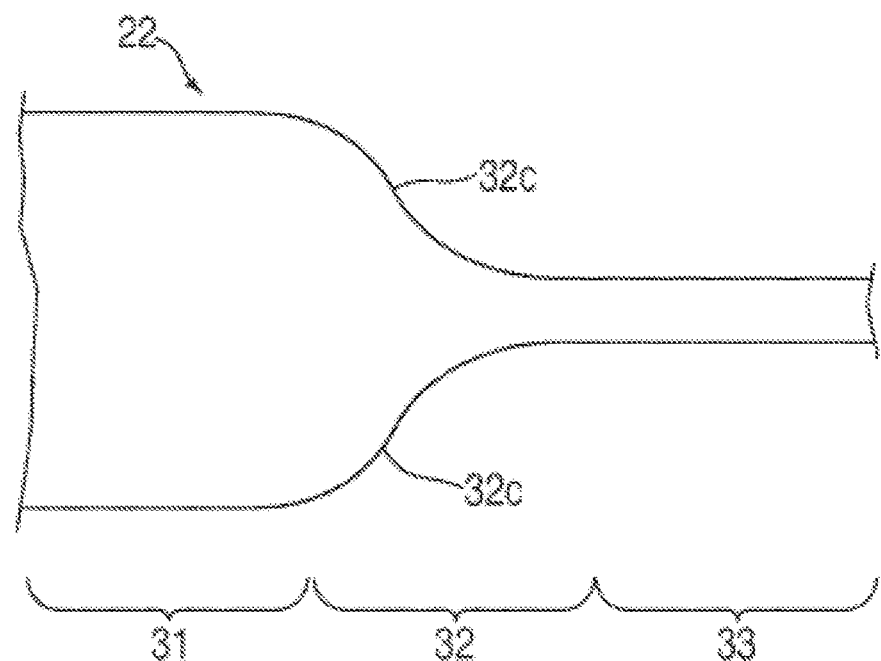
FIGS. 1C and 1D show illustrative cross-sectional views of a portion of a leg in accordance with some embodiments of the invention.
Figure 1D:
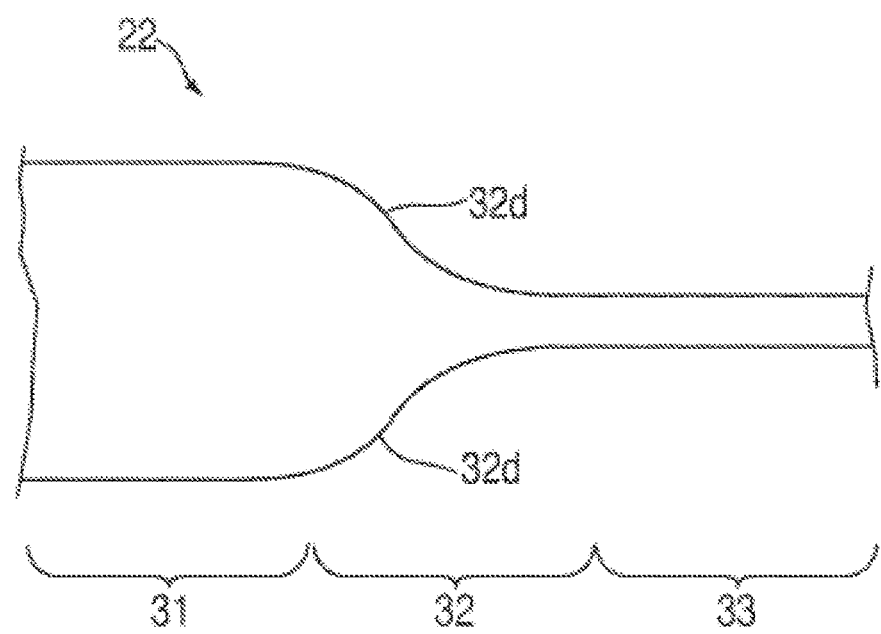
Figure 1E:
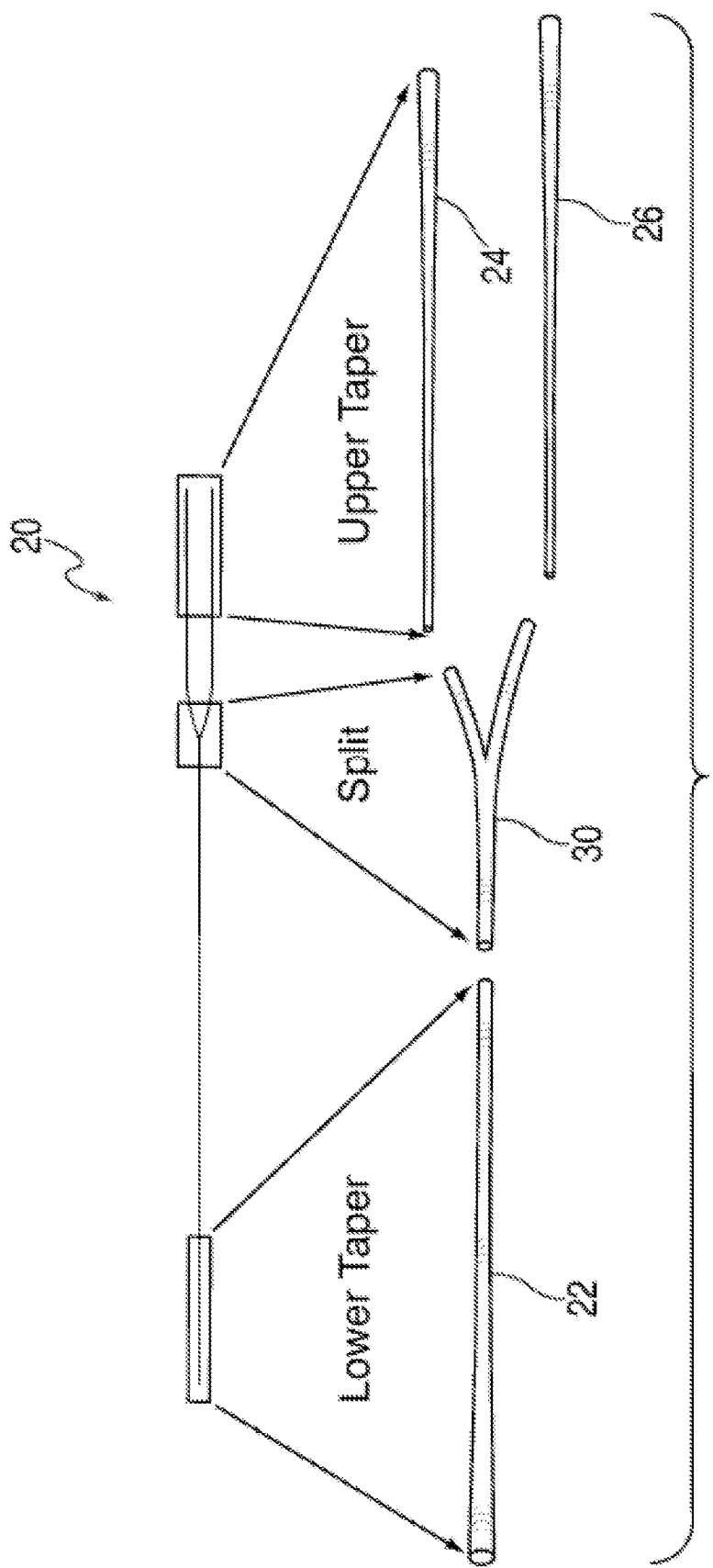
FIG. 1E shows an illustrative headset having a variable diameter in accordance with some embodiments of the invention.

As shown in FIG. 1E, cable structure 20 can include legs 22, 24 and 26 that interface at bifurcation region 30. Each leg can have a varying diameter or shape to provide a cable structure with a smooth outer surface and appealing cosmetic features.

FIGS. 1C and 1D show illustrative cross-sectional views of a portion of main leg 22 in accordance with embodiments of the invention. Both FIGS. 1C and 1D show main leg 22 with a center axis (as indicated by the dashed line) and symmetric curves 32c and 32d. Curves 32c and 32d illustrate that any suitable curve profile may be used in bump region 32. Thus the outer surface of bump region 32 can be any surface that deviates from planarity in a smooth, continuous fashion.

Interface regions 31, 34, and 37 can each have a predetermined diameter and length. The diameter of any interface region can be substantially the same as the diameter of the non-cable component it is physically connected to, to provide an aesthetically pleasing seamless integration. For example, the diameter of interface region 31 can be substantially the same as the diameter of non-cable component 40. In some embodiments, the diameter of a non-cable component (e.g., component 40) and its associated interfacing region (e.g., region 31) are greater than the diameter of the non-interface region (e.g., region 33) they are connected to via the bump region (e.g., region 32). Consequently, in this embodiment, the bump region decreases in diameter from the interface region to the non-interface region.

In another embodiment, the diameter of a non-cable component (e.g., component 40) and its associated interfacing region (e.g., region 31) are less than the diameter of the non-interface region (e.g., region 33) they are connected to via the bump region (e.g., region 32). Consequently, in this embodiment, the bump region increases in diameter from the interface region to the non-interface region.

The combination of the interface and bump regions can provide strain relief for those regions of headset 10. In one embodiment, strain relief may be realized because the interface and bump regions have larger dimensions than the non-interface region and thus are more robust. These larger dimensions may also ensure that non-cable portions are securely connected to cable structure 20. Moreover, the extra girth better enables the interface and bump regions to withstand bend stresses.

The interconnection of legs 22, 24, and 26 at bifurcation region 30 can vary depending on how cable structure 20 is manufactured. In one approach, cable structure 20 can be a jointly formed multi-leg or single-segment unibody cable structure. In this approach all three legs are manufactured jointly as one continuous structure and no additional processing is required to electrically couple the conductors contained therein. That is, none of the legs are spliced to interconnect conductors at bifurcation region 30, nor are the legs manufactured separately and then later joined together. Some jointly formed multi-leg cable structures may have a top half and a bottom half, which are molded together and extend throughout the entire cable structure. For example, such jointly formed multi-leg cable structures can be manufactured using injection molding and compression molding manufacturing processes. Thus, although a mold-derived jointly formed multi-leg cable structure has two components (i.e., the top and bottom halves), it is considered a jointly formed multi-leg cable structure for the purposes of this disclosure. Other jointly formed multi-leg cable structures may exhibit a contiguous ring of material that extends throughout the entire cable structure. For example, such a jointly formed multi-leg cable structure can be manufactured using an extrusion process.

In another approach, cable structure 20 can be a multi-segment unibody cable structure in which three discrete or independently formed legs are connected at a bifurcation region. A multi-segment unibody cable structure may have the same appearance of the jointly formed multi-leg cable structure, but the legs are manufactured as discrete components. The legs and any conductors contained therein are interconnected at bifurcation region 30. The legs can be manufactured, for example, using any of the processes used to manufacture the jointly formed multi-leg cable structure.

The cosmetics of bifurcation region 30 can be any suitable shape. In one embodiment, bifurcation region 30 can be an overmold structure that encapsulates a portion of each leg 22, 24, and 26. The overmold structure can be visually and tactilely distinct from legs 22, 24, and 26. The overmold structure can be applied to the single or multi-segment unibody cable structure. In another embodiment, bifurcation region 30 can be a two-shot injection molded splitter having the same dimensions as the portion of the legs being joined together. Thus, when the legs are joined together with the splitter mold, cable structure 20 maintains its unibody aesthetics. That is, a multi-segment cable structure has the look and feel of jointly formed multi-leg cable structure even though it has three discretely manufactured legs joined together at bifurcation region 30. Many different splitter configurations can be used, and the use of some splitters may be based on the manufacturing process used to create the segment.

Cable structure 20 can include a conductor bundle that extends through some or all of legs 22, 24, and 26. Cable structure 20 can include conductors for carrying signals from non-cable component 40 to non-cable components 42 and 44. Cable structure 20 can include one or more rods constructed from a superelastic material. The rods can resist deformation to reduce or prevent tangling of the legs. The rods are different than the conductors used to convey signals from non-cable component 40 to non-cable components 42 and 44, but share the same space within cable structure 20. Several different rod arrangements may be included in cable structure 20.

In yet another embodiment, one or more of legs 22, 24, and 26 can vary in diameter in two or more bump regions. For example, the leg 22 can include bump region 32 and another bump region (not shown) that exists at leg/bifurcation region 30. This other bump region may vary the diameter of leg 22 so that it changes in size to match the diameter of cable structure at bifurcation region 30. This other bump region can provide additional strain relief. Each leg can have any suitable diameter including, for example, a diameter in the range of 0.4 mm to 1 mm (e.g., 0.8 mm for leg 20, and 0.6 mm for legs 22 and 24).

In some embodiments, another non-cable component can be incorporated into either left leg 24 or right leg 26. As shown in FIG. 1B, headset 60 shows that non-cable component 46 is integrated within leg 26, and not at an end of a leg like non-cable components 40, 42 and 44. For example, non-cable component 46 can be a communications box that includes a microphone and a user interface (e.g., one or more mechanical or capacitive buttons). Non-cable component 46 can be electrically coupled to non-cable component 40, for example, to transfer signals between communications box 46 and one or more of non-cable components 40, 42 and 44.

Non-cable component 46 can be incorporated in non-interface region 39 of leg 26. In some cases, non-cable component 46 can have a larger size or girth than the non-interface regions of leg 26, which can cause a discontinuity at an interface between non-interface region 39 and communications box 46. To ensure that the cable maintains a seamless unibody appearance, non-interface region 39 can be replaced by first non-interface region 50, first bump region 51, first interface region 52, communications box 46, second interface region 53, second bump region 54, and second non-interface region 55.

Similar to the bump regions described above in connection with the cable structure of FIG. 1A, bump regions 51 and 54 can handle the transition from non-cable component 46 to non-interface regions 50 and 55. The transition in the bump region can take any suitable shape that exhibits a fluid or smooth transition from the interface region to the non-interface regions. For example, the shape of the taper region can be similar to that of a cone or a neck of a wine bottle.

Similar to the interface regions described above in connection with the cable structure of FIG. 1A, interface regions 52 and 53 can have a predetermined diameter and length. The diameter of the interface region is substantially the same as the diameter of non-cable component 46 to provide an aesthetically pleasing seamless integration. In addition, and as described above, the combination of the interface and bump regions can provide strain relief for those regions of headset 10.

In some embodiments, non-cable component 46 may be incorporated into a leg such as leg 26 without having bump regions 51 and 54 or interface regions 52 and 53. Thus, in this embodiment, non-interfacing regions 50 and 55 may be directly connected to non-cable component 46.

Cable structures 20 can be constructed using many different manufacturing processes. The processes discussed herein include those that can be used to manufacture the jointly formed multi-leg cable structure or leas for the multi-segment unibody cable structure. In particular, these processes include injection molding, compression molding, and extrusion. Embodiments of this invention use extrusion to manufacture a jointly formed multi-leg cable structure or multi-segment unibody cable structures.

Figure 2:
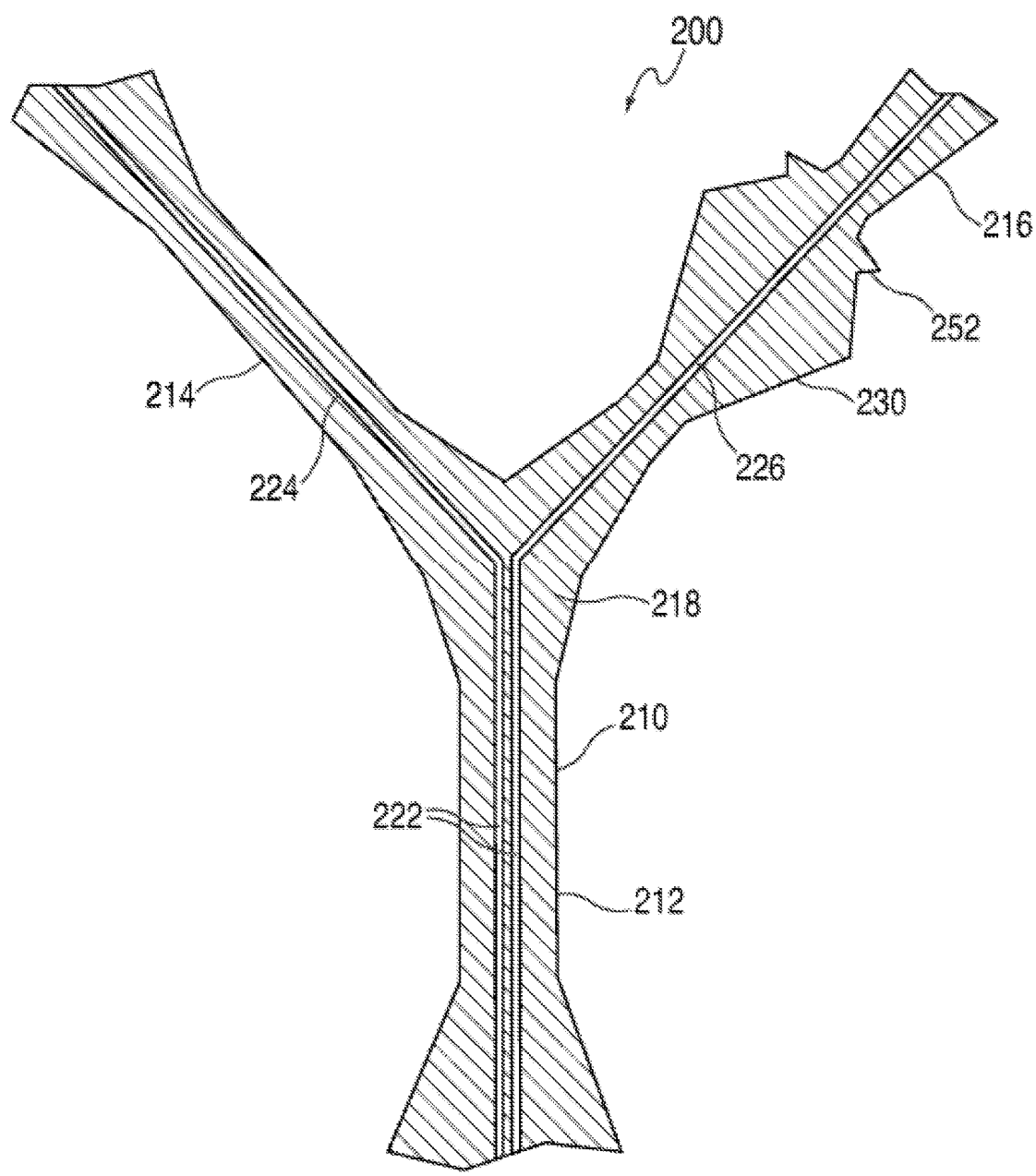
FIG. 2 is a sectional view of an illustrative mold for constructing a jointly formed multi-segment cable structure in accordance with some embodiments of the invention.

In some embodiments, cable structure 20 can be constructed by molding material around a rod or around a conductor bundle to form one or more legs of a multi-segment cable structure. FIG. 2 is a sectional view of an illustrative mold for constructing a jointly formed multi-segment cable structure in accordance with some embodiments of the invention. Mold 200 can be shaped to correspond to multi-segment cable structure 210 having main leg 212, left leg 214, and right leg 216. Different non-cable components can be coupled to ends of legs 212, 214 and 216. For example, an audio plug can be provided at an end of leg 212, and earbuds or other audio output components can be provided at ends of left leg 214 and right leg 216.

Each of legs 212, 214 and 216 can include a conductor bundle for transferring electrical signals through cable structure 210. For example, left leg 214 can include left conductor bundle 224, and right leg 216 can include right conductor bundle 226. Conductor bundles 224 and 226 can combine to form main conductor bundle 222 within main leg 212. Conductor bundles 222, 224 and 226 can serve to transfer any suitable signal including, for example, audio signals corresponding to an earbud or to a microphone, or instructions for controlling the operation of the device. To improve the performance and aesthetic appeal of the device, conductor bundles 222, 224 and 226 can be centered in legs 212, 214, and 216, respectively.

To protect the conductor bundles, and to provide an aesthetically pleasing cable structure, a material can be provided over the conductor bundles. In particular, material can be injected within mold 200 to create shell 230 of material in each leg surrounding the conductor bundles. Outer shell 230 can be constructed from any suitable material including, for example, a material selected for mechanical attributes, cosmetic attributes, industrial design attributes, or combinations of these. In some cases, the material can be selected to provide sufficient resistance to abrasions and other contact forces applied to the cable, while allowing the cable to bend freely or comfortably for the user.

Shell 230 can have any suitable size relative to conductor bundles 222, 224, and 226. In some embodiments, shell 230 can have a variable diameter. For example, shell 230 can include a bump region, protruding regions, interlocking or returning regions (e.g., return 252 for coupling with a non-cable component), or any other feature causing the diameter or size of shell 230 to vary. In some embodiments, the diameter or size of shell 230 can vary in a non-uniform manner, for example to feature a non-circular diameter, a hook, protrusion, or another feature (e.g., for engaging an electrical component, such as an audio output interface or a button assembly). As another example, shell 230 can have a varying diameter near bifurcation region 218, for example to control strain where main leg 222 splits into left leg 224 and right leg 226.

Some molding processes including, for example, injection molding, provide for the injection of material within a mold. In some cases, the injection may occur at relatively high pressure. When conductor bundles are provided in the mold, as shown in mold 200, the injection of material can cause the conductor bundles to be displaced in the mold and no longer be centered in each leg. This may cause a conductor bundle to sag within shell 230, become visible through a thin region of shell 230, or perhaps even extend through shell 230. Therefore, it may be desirable for the mold or system used for molding a multi-segment cable structure to provide a mechanism for maintaining conductor bundles centered within the mold.

Figure 3:
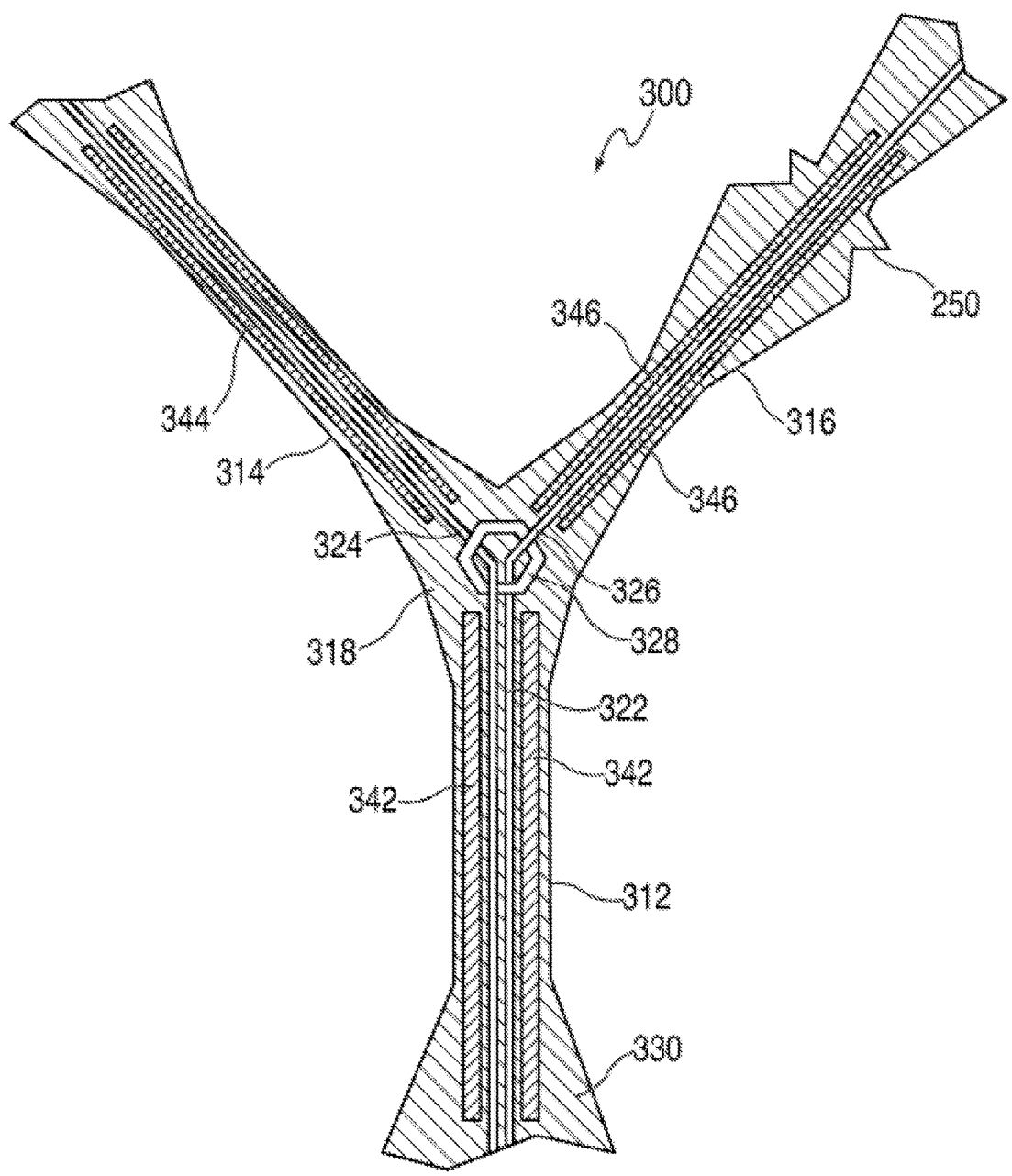
FIG. 3 is a sectional view of a portion of a mold for a cable structure in which conductor bundles are retained using movable tubes in accordance with some embodiments of the invention.

FIG. 3 is a sectional view of a portion of a mold for a cable structure in which conductor bundles are retained using movable tubes in accordance with some embodiments of the invention. Mold 300 can include main leg 312, left leg 314 and right leg 316. Main conductor bundle 322 can be provided within main leg 312, and can split into left conductor bundle 324 in left leg 314 and right conductor bundle 326 in right leg 316. The conductor bundles can be secured in bifurcation region 318 by guide 328 to ensure that the conductor bundles remain centered in the bifurcation region. For example, guide 328 may prevent the conductor bundles from being displaced towards an exterior region of mold 300 in bifurcation region 318 when tension is applied to the conductor bundles.

To maintain the conductor bundles centered within their respective legs, mold 300 can include main tube 342 inserted within an open end of main leg 312 (e.g., an end opposite bifurcation region 318) and extending towards bifurcation region 318. Similarly, mold 300 can include left tube 344 inserted within an open end of left leg 314 and extending towards bifurcation region 318, and right tube 346 inserted within an open end of right leg 316 and extending towards bifurcation region 318.

Each tube can include a hollow portion extending along a length of the tube for receiving a conductor bundle. An inner diameter of the tube can be selected, for example, based on the size of the conductor bundle placed within the tube, and in particular on the number and dimensions of individual conductors placed within a bundle. For cable structures where conductor bundle 322 is larger than conductor bundles 324 or 326, the inner diameter of main tube 342 may be larger than the inner diameter of left tube 344 or right tube 346. By selecting the inner diameter of a tube relative to the dimensions of a conductor bundle, the tube can ensure that a conductor bundle will remain centered within the tube.

To ensure that the conductor bundle remains centered within each leg, however, it may be necessary to ensure that the tube is centered within the mold. The outer diameter of each tube can be selected based on the dimensions of mold 300 corresponding to a final diameter for outer shell 330 in each leg. In particular, each tube can be sized to substantially fit within a particular leg. In one implementation, the outer diameter selected for each tube can be substantially equal to or marginally smaller than the dimensions of mold 300 for a leg corresponding to the tube. By making the outer diameter of each tube smaller than the smallest dimension of mold 300 for a leg, the tube can slide within mold 300 as material is injected to create shell 330.

The tubes can be formed from any suitable material. In some embodiments, the tubes can be formed from a rigid or semi-rigid material, so that the tubes can retain the bundles along a centerline of the mold. In particular, the tubes can be rigid so that in regions of the mold having larger outer diameters (e.g., regions corresponding to a bump region or an interface region), the tubes can remain centered due to contact between the tubes and regions of the mold that have smaller outer diameters (e.g., regions corresponding to a non-interface region). In some cases, the tube material can be selected based on thermal properties to ensure, for example, that the integrity of a tube is not affected by the heated material injected into the mold.

Although mold 300 shows a single tube placed in each leg of the mold, in some cases several tubes or tube segments can be placed end to end within a leg of a mold to maintain a conductor bundle centered. When the several tube segments translate out of an end of a leg, each tube segment can be sequentially removed from the mold.

In some cases, tension can be applied to conductor bundles 322, 324 and 326 to ensure that the conductor bundles are taut within mold 300. When tension is applied to the conductor bundles, guide 328 can ensure that the conductor bundles remain centered within bifurcation region 318. In some cases, the tension can serve to maintain conductor bundles 322, 324, and 326 centered when material is injected into mold 300. To prevent the conductor bundles from moving relative to one another, guide 328 can include a crimp for securing the conductor bundles. In some cases, guide 328 can provide strain relief to the cable structure at bifurcation region 318.

Figure 4:
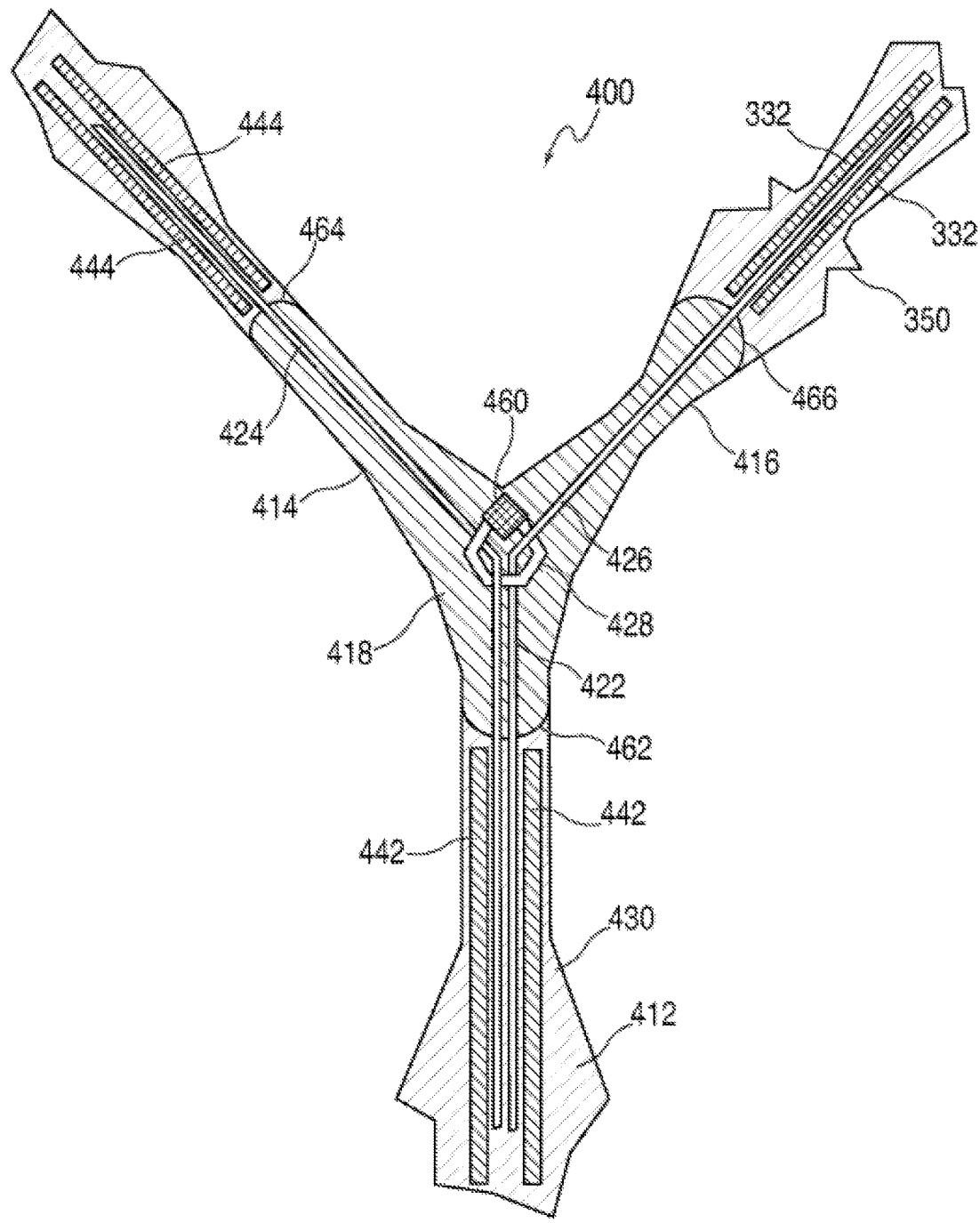
FIG. 4 is a sectional view of a portion of a mold for a cable structure in which movable tubes for constraining conductor bundles are moved in accordance with some embodiments of the invention.

FIG. 4 is a sectional view of a portion of a mold for a cable structure in which movable tubes for constraining conductor bundles are moved in accordance with some embodiments of the invention. Mold 400 can include main leg 412, left leg 414, and right leg 416 each having conductor bundles 422, 424, and 426, respectively, having some or all of the features described above in connection with mold 300 (FIG. 3). To create shell 430, material can be injected into mold 400 via gate 460 located adjacent to bifurcation region 418 and guide 428. Gate 460 can have any suitable size including, for example, a size determined from thermal conductive properties of the material (e.g., how quickly molded material will harden when it flows within the mold), or from an expected rate of flow of the material.

Gate 460 can be located at any suitable position along mold 400. In the example of FIG. 4, gate 460 can be placed adjacent to bifurcation region 418 such that material injected into the mold can simultaneously flow into each of legs 412, 414, and 416. In some embodiments, gate 460 can be positioned or oriented in a manner to bias the flow of material towards one or more of the legs. For example, if main arm 412 is longer or wider than left leg 414 or right leg 416, gate 460 can be designed such that more material flows towards the main leg 412 than left and right leas 414 and 416. For example, twice as much material can flow into main leg 412 as in one of left leg 414 and right leg 416.

As the material is injected into mold 400, indicated by material front 462 in main leg 412, material front 464 in left leg 414, and material front 466 in right leg 416, the material can flow into each leg. The material and mold can be provided such that the material can flow through the entirety of each leg of the mold before hardening and securing the conductor bundles within the cable structure. For example, the material can be heated to a particular temperature at which it becomes more viscous. As another example, portions of mold 400 can be heated or cooled to control the viscosity of the material within the mold.

As the material fronts move when material is inserted through gate 460, it may be necessary to remove the tubes holding the conductor bundles so that the material can fill mold 400 and can adhere to the conductor bundles. In some embodiments, each tube can be displaced along the axis of a leg in which the tube is placed away from gate 460. For example, as the material front comes near or into contact with a tube, the tube can retract to allow the material to surround the conductor bundles previously retained within the tubes.

Any suitable approach can be used to move a tube. In some embodiments, the material front can contact and push away the tubes (e.g., the mold pressure is used to displace a tube). Alternatively, or in addition, one or more actuators, valves, or other mechanisms can be coupled to a tube to remove the tube from a leg in which it is placed, or to control a rate at which the tube is removed (e.g., a motor pulls a tube out of a leg). As another alternative, mold 400 can be oriented substantially vertically such that at least one of legs 412, 414, and 416 extends along a gravity vector. Then, when material is injected into mold 400, gravity can direct the material into the leg, and can assist in removing a tube from the leg.

Figure 5:
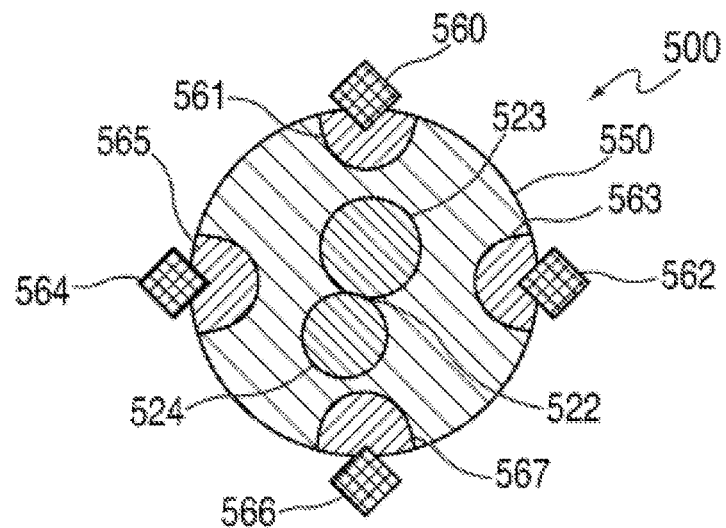
FIG. 5 is a sectional view of an illustrative mold for a cable structure having centered conductor bundles in accordance with one embodiment of the invention.

In some cases, the mold can make use of approaches other than translating tubes to maintain a conductor bundle centered within a leg. FIG. 5 is a sectional view of an illustrative mold for a cable structure having centered conductor bundles in accordance with one embodiment of the invention. Conductor bundle 522, including conductors or rods 523 and 524, can be placed within mold 500 and maintained near a centerline of mold 500. In some cases, conductor bundle 522 can be substantially equidistant from surfaces of mold 500.

One approach for maintaining conductor bundle 522 substantially centered can include providing material into mold 500 such that material fronts of the injected material surround conductor bundle 522 from opposite directions. For example, mold 500 can include gates 560, 562, 564 and 564 placed at 90 degree intervals around a periphery of mold 500. As material is inserted in each gate, material front 561 corresponding to gate 560, material front 563 corresponding to gate 562, material front 565 corresponding to gate 566, and material front 567 corresponding to gate 566 can surround conductor bundle 522. By controlling the amount, rate and time at which material is provided in each gate, opposing material fronts (e.g., material front 561 and material front 567) can reach conductor bundle 522 at the same time. The opposing material fronts can then maintain conductor bundle 522 substantially near the centerline of mold 500.

Mold 500 can include any suitable configuration of gates through which material may be provided. For example, as shown in FIG. 5, mold 500 can include four gates having similar dimensions. As another example, mold 500 can include another number of gates disposed at equal intervals around mold 500 (e.g., a number of gates in the range of 2 to 10). Alternatively, if mold 500 includes gates having different sizes or different properties, the distribution of gates can include uneven intervals selected based on the amount of material flowing into the mold through each gate. For example, a mold having three gates can include a first, larger gate at a first position, and two other, smaller gates, offset from the first gate by 150 degrees (and offset from each other by 60 degrees). In some cases, one or more valves can control the amount of flow in each gate.

Figure 6:
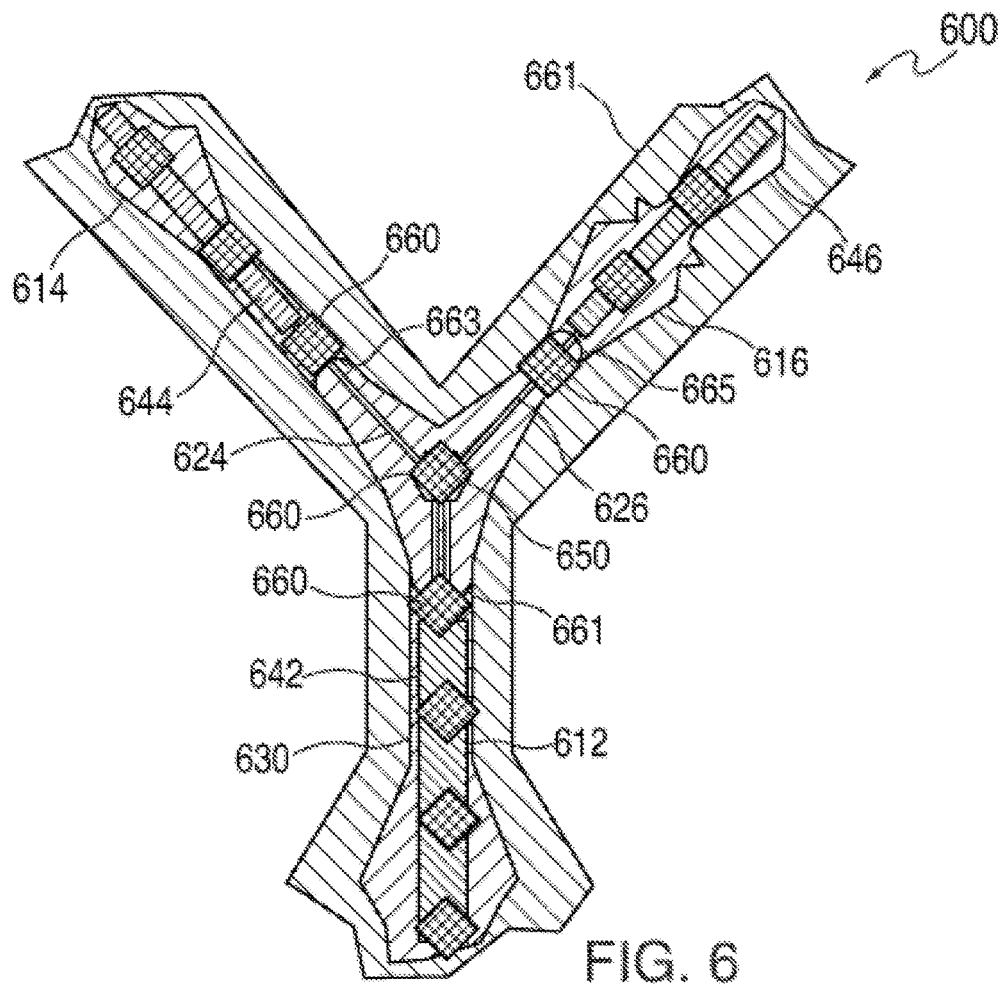
FIG. 6 is a sectional view of a portion of a mold for a cable structure, the mold having a runner with several gates through which material is provided in accordance with some embodiments of the invention.

FIG. 6 is a sectional view of a portion of a mold for a cable structure, the mold having a runner with several gates through which material is provided in accordance with some embodiments of the invention. Mold 600 can include main leg 612, left leg 614, and right leg 616 each having conductor bundles 622, 624, and 626, respectively, having some or all of the features described above. To create shell 630, material can be injected into mold 600 via runner 650. Runner 650 can include several gates 660 disposed adjacent to one or more of main leg 612, left leg 614, right leg 616, and bifurcation region 618. Each gate 660 can have any suitable size including, for example, a size determined from thermal conductive properties of the material (e.g., how quickly molded material will harden when it flows within the mold), or from an expected rate of flow of the material. Control circuitry can serve to selectively open one or more gates of runner 650.

Material can be released into mold 600 by gates of runner 650 using any suitable approach. In some embodiments, material can be sequentially or simultaneously released through one or more gates 660 of runner 650. For example, a gate near bifurcation region 618 can initially be opened, and subsequently gates on each leg can be opened sequentially as material flows away from bifurcation region 618. The time at which individual gates are opened can be determined from the position of a material front, the position of tubes 642, 644, and 646 (which can include some or all of the features of tubes described above) displaced from within mold 600, or combinations of these. In some cases, mold 600 can include one or more sensors for determining a current position of a material front.

In some embodiments, runner 650 can be heated to ensure that the material used for shell 630 remains sufficiently viscous and liquid to flow through the gates and into the mold. For example, runner 650 can include a heating element that heats the runner to a minimum temperature selected, for example, based on phase change temperatures of the material.

In some embodiments, mold 600 may not include tubes 642, 644, and 646. Instead, gates 660 can be disposed around the periphery of mold 600 (e.g., as shown in FIG. 5) to simultaneously inject, from several directions, material around conductor bundles 622, 624 and 626. As material is injected around conductor bundles 622, 624, and 626, the conductor bundles can be secured near a centerline of mold 600. In some cases, however, the disposition of the gates can be combined with movable tubes.

Figure 7:
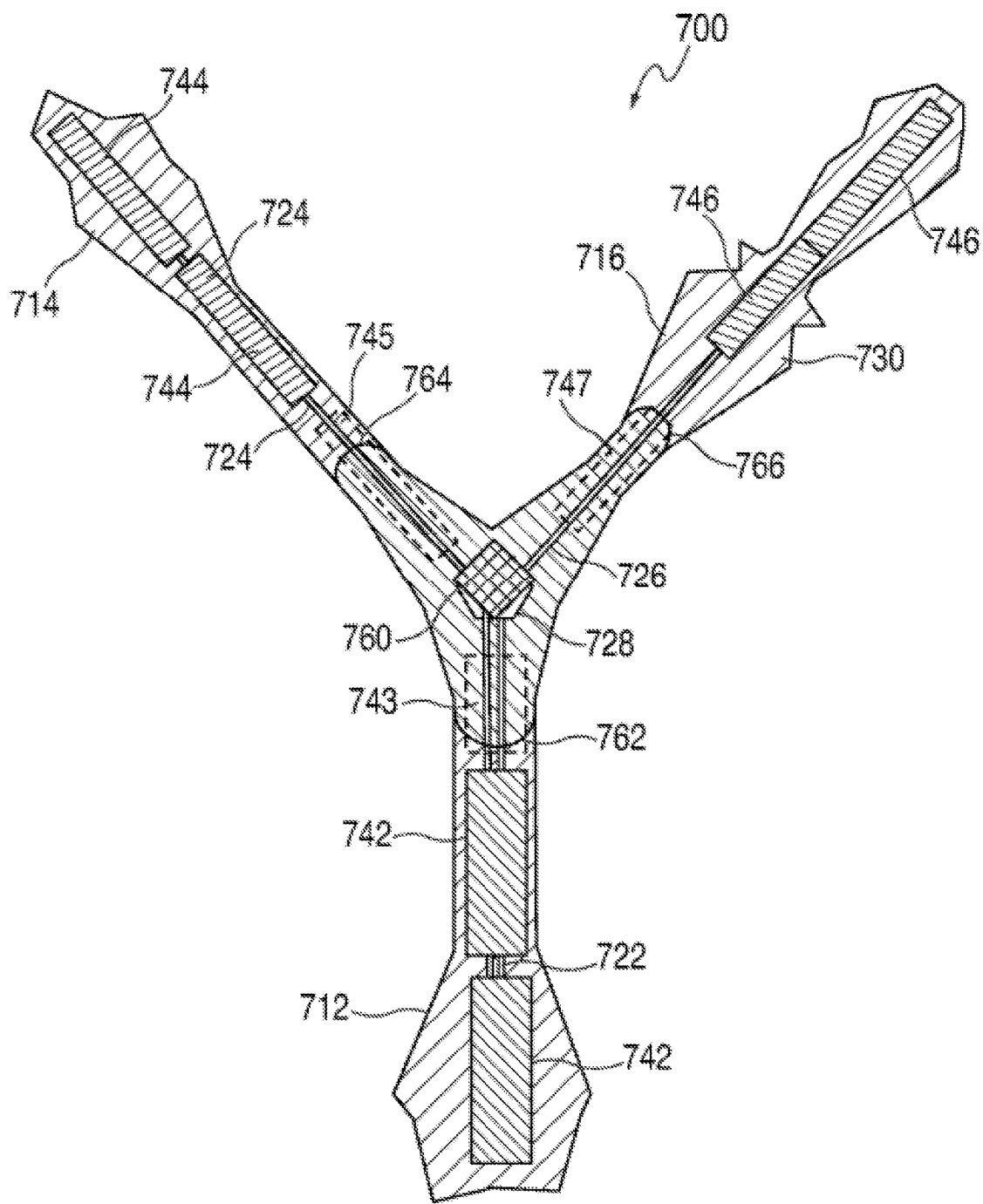
FIG. 7 is a sectional view of a portion of a mold for a cable structure in which tubes maintaining a position of a conductor bundle are incorporated in the cable structure in accordance with some embodiments of the invention.

In some cases, the material used for a tube placed in a mold can be selected such that the tube may disappear or be integrated with the material. FIG. 7 is a sectional view of a portion of a mold for a cable structure in which tubes maintaining a position of a conductor bundle are incorporated in the cable structure in accordance with some embodiments of the invention. Mold 700 can include main leg 712, left leg 714, and right leg 716 each having conductor bundles 722, 724, and 726, respectively, having some or all of the features described above. To create shell 730, material can be injected into mold 700 via gate 760 located adjacent to bifurcation region 718 and guide 728. Gate 760 can have any suitable size including, for example, a size determined from thermal conductive properties of the material (e.g., how quickly molded material will harden when it flows within the mold), or from an expected rate of flow of the material. As material flows from gate 760 into each of legs 712, 714, and 716, the material can form a material front in the legs. For example, material can form material front 762 in leg 712, material front 764 in leg 714, and material front 766 in leg 716.

Mold 700 can include tubes 742, 744, and 746 surrounding conductor bundles 722, 724, and 726, respectively so that the conductor bundles remain centered within legs 712, 714, and 716. In some cases, each tube can be constructed from several segments placed end to end. The individual segments can be placed in contact with each other, or can instead be offset relative to one another.

Because it may be complex to displace and remove a tube as a material front approaches, tubes 742, 744, and 746 can be constructed from a material that dissolves, vaporizes, mingles, or otherwise disappears when it is placed in contact with the molded material. For example, a material selected for tubes 742, 744, and 746 can change from a solid phase to a liquid phase when it is heated by the material front. As another example, a chemical bond of the material can be broken when the material front comes into contact with the tube material. The tube material can co-mingle with the molded material to create shell 730, for example as shown with segments 743, 745, and 747 of tubes 742, 744, and 746, respectively. Alternatively, the material of each tube segment can vaporize, and the vapors of the material can be evacuated out of mold 700 (e.g., through the open end of each leg).

Figure 8:
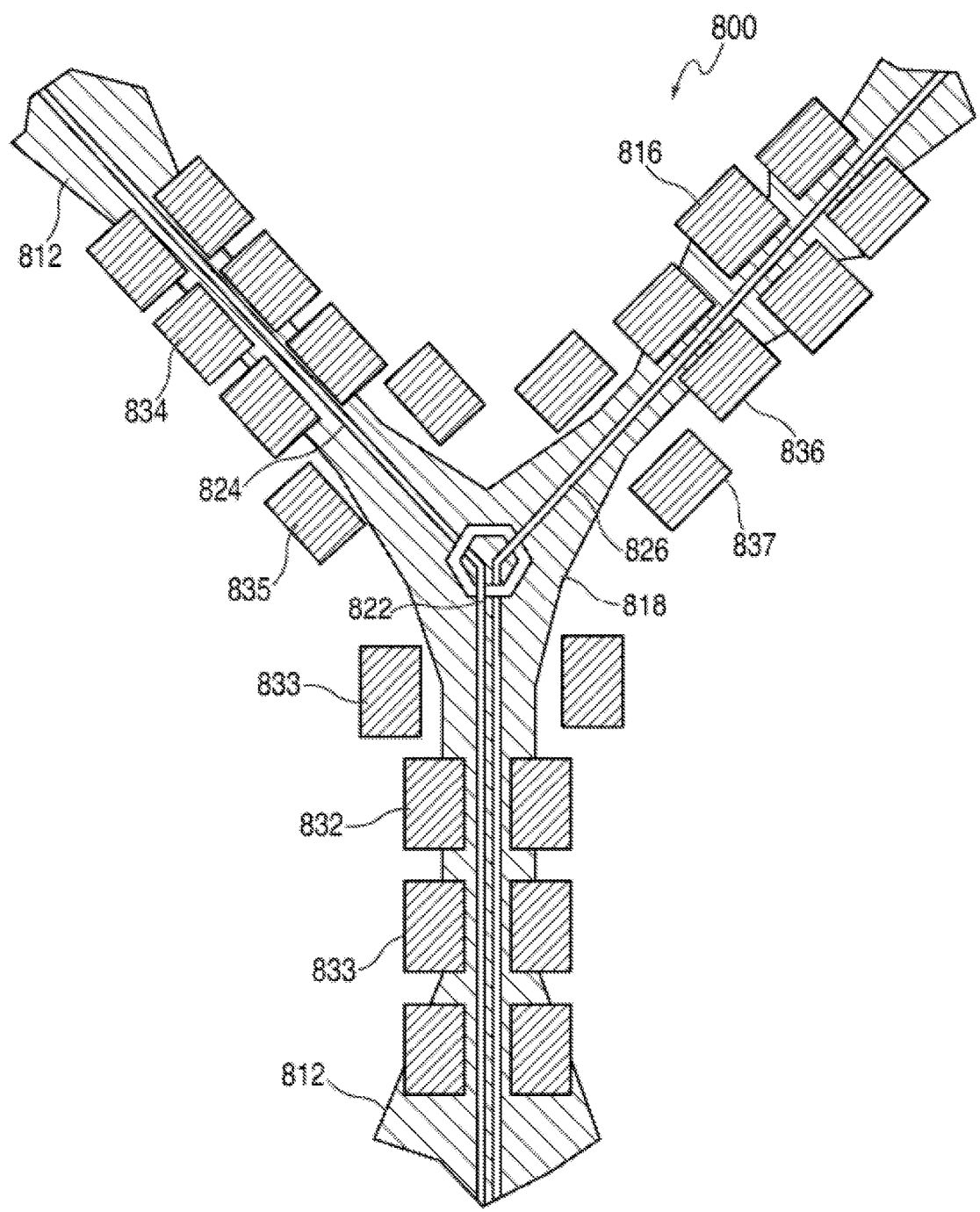
FIG. 8 is a sectional view of a portion of a mold for a cable structure in which a conductor bundle can be retained by removable pins in accordance with some embodiments of the invention.

In some cases, conductor bundles can remain centered by removable pins placed within the mold. FIG. 8 is a sectional view of a portion of a mold for a cable structure in which a conductor bundle can be retained by removable pins in accordance with some embodiments of the invention. Mold 800 can include main leg 812, left leg 814, and right leg 816 each having conductor bundles 822, 824, and 826, respectively, having some or all of the features described above.

To retain each conductor bundle near a centerline of a leg, each leg can include a pin assembly that includes several individual pins retaining a conductor bundle. For example, main leg 812 can include pin assembly 832 having pins 833, left leg 814 can include pin assembly 834 having pins 835, and right leg 816 can include pin assembly 836 having pins 837. Each pin can be moved within mold 800 such that in a first configuration, a pin can be placed in contact with a conductor bundle (e.g., to maintain a conductor bundle centered), and in a second configuration, a pin can be removed from the mold (e.g., and form a sidewall of the mold). Pins can be selectively displaced, for example based on a current position of a material front of material injected into mold 800.

Each pin can have any suitable shape. For example, a pin can have a surface formed to correspond to a shape of the conductor bundle. As another example, a pin can have a surface corresponding to an exterior surface of the cable structured to be molded (e.g., when the pin is moved away from the cable structure and becomes a boundary of mold 800). The size and spacing of the pins can vary along each leg. For example, pins can be more closely spaced in regions of mold 800 adjacent to bifurcation region 818 to more accurately retain a conductor bundle when material is initially injected into mold 800. As another example, pins can be larger in regions of mold 800 adjacent to bifurcation region 818.

Figure 9:
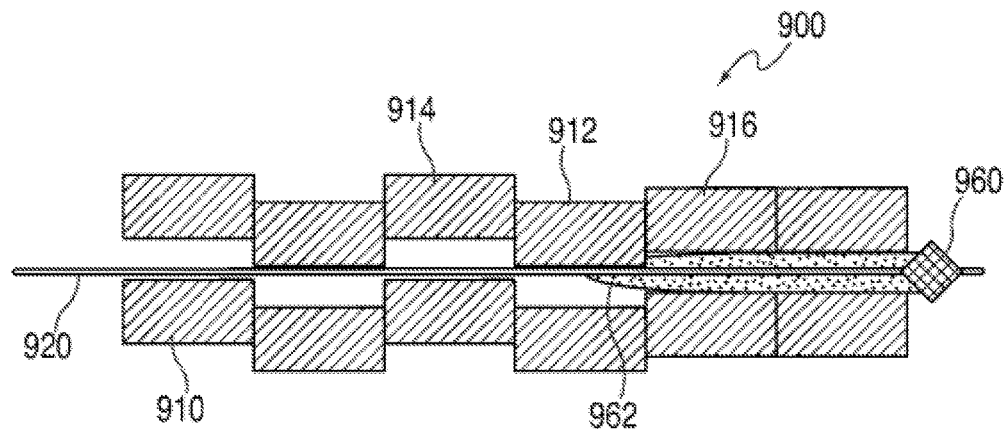
FIG. 9 is a sectional view of a portion of a mold corresponding to a leg of a multi-segment cable structure having dynamic components in accordance with some embodiments of the invention.

In some cases, conductor bundles can be maintained in a centered position by using a dynamic mold. FIG. 9 is a sectional view of a portion of a mold corresponding to a leg of a multi-segment cable structure having dynamic components in accordance with some embodiments of the invention. Conductor bundle 920 can be placed within mold 900. Mold 900 can include a sequence of mold segments 910 that may be displaced relative to one other in a plane perpendicular to conductor bundle 920. In particular, adjacent mold segments 910 can be offset relative to one another such that opposite inner surfaces of each mold section are in contact with the conductor bundle. For example, conductor bundle 920 can be supported by an upper inner surface of segment 912, and by a lower inner surface of segment 914. Individual segments can alternate in any suitable direction including, for example, sequences of three or more segments offset in different directions. The alternating mold segments can thus maintain conductor bundle 920 in a centered position (e.g., conductor bundle 920 can be statically positioned for a molding process).

Material can be injected into mold 900 via gate 960. As material flows into the mold, segments 910 can be displaced to define the desired shape for the cable structure. Mold segments 910 that are displaced may move to a centered position and release conductor bundle 920. For example, segments can move to the position shown by segment 916 when material front 962 reaches the beginning of the segment.

Figure 10A:
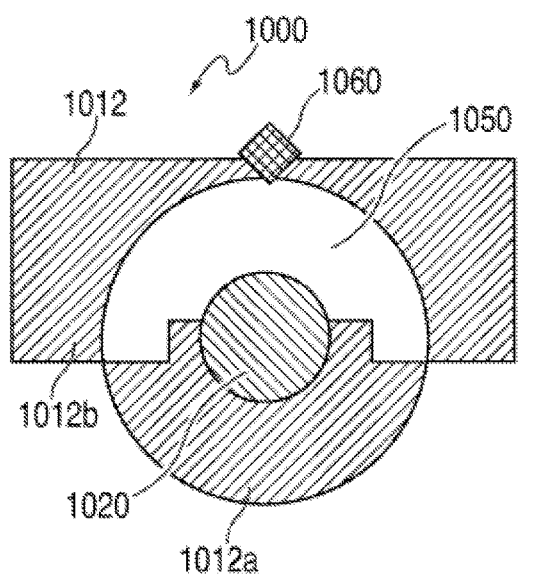
FIGS. 10A and 10B are sectional views of different molds that can be used to mold a cable structure having a centered conductor bundle using a two-shot molding process in accordance with one embodiment of the invention.
Figure 10B:
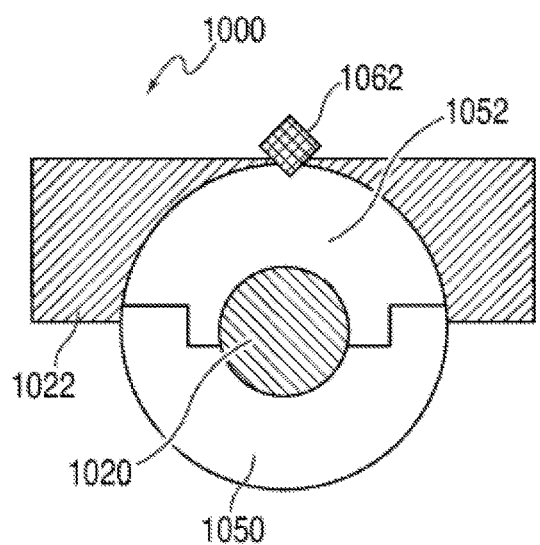

In some cases, a two-shot molding process can be used to create a cable structure having a centered conductor bundle. FIGS. 10A and 10B are sectional views of different molds that can be used to mold a cable structure having a centered conductor bundle using a two-shot molding process in accordance with one embodiment of the invention. Cable structure 1000 can be constructed by placing conductor bundle 1020 successively in two different molds. Initially, conductor bundle can be placed in mold segment 1012a, over which mold segment 1012b can be secured. Material can be injected into mold 1012b via gate 1060 to create first half 1050 of a cable structure leg. Once first half 1050 has been molded, it may be removed, along with conductor bundle 1020, which may be partially secured to first half 1050, and placed in second mold 1022. Material can then be provided into mold 1022 through gate 1062 to create second half 1052 of the cable structure leg. The resulting cable structure can include two molded regions around the conductor bundle, which may be centered by virtue of the shape of molds 1012 and 1022.

Figure 11:
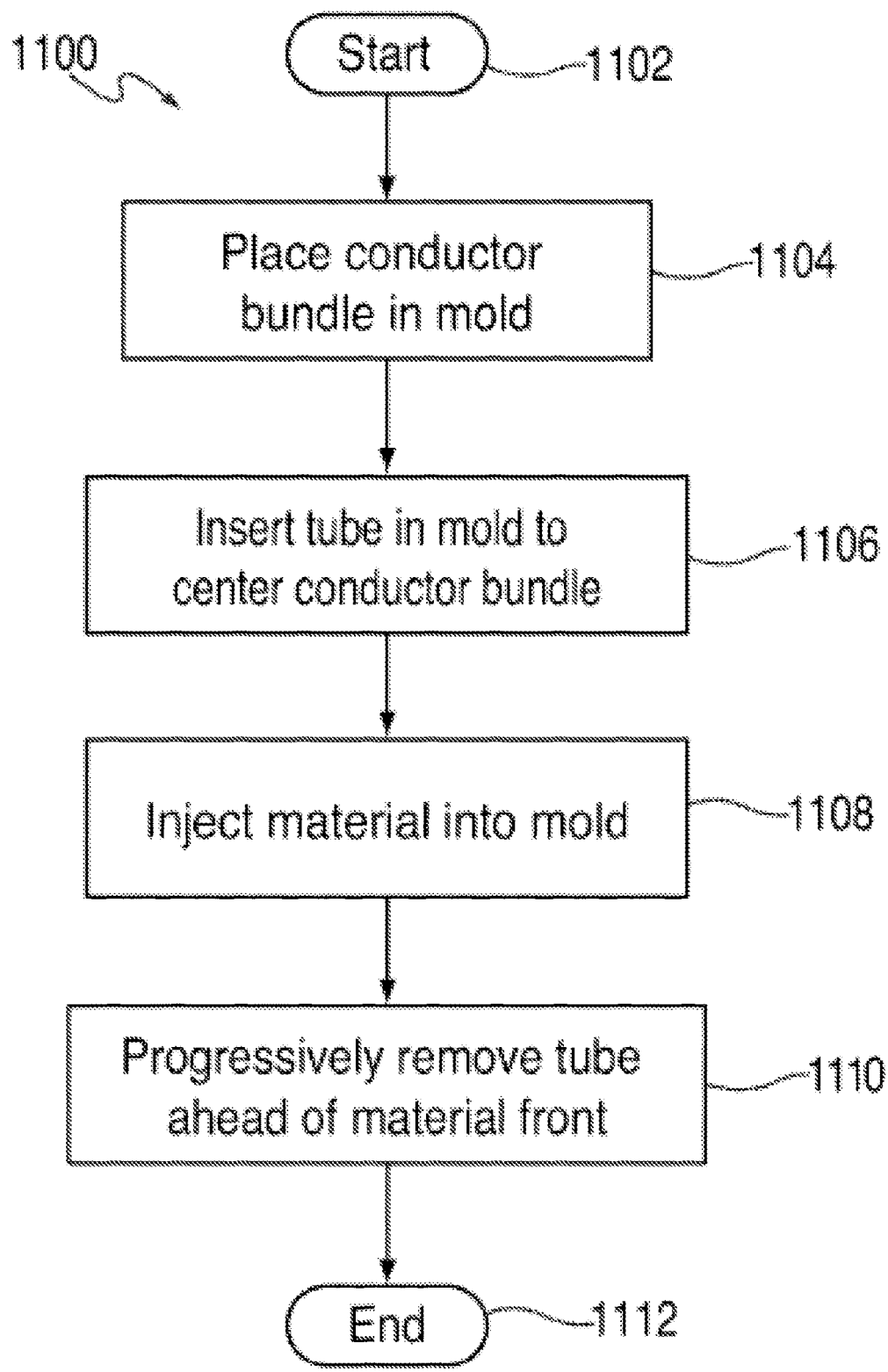
FIG. 11 is flowchart of an illustrative process for molding a cable structure having a centered conductor bundle in accordance with some embodiments of the invention.

FIG. 11 is flowchart of an illustrative process for molding a cable structure having a centered conductor bundle in accordance with some embodiments of the invention. Process 1100 can begin at step 1102. At step 1104, a conductor bundle can be placed in a mold. For example, a conductor bundle can be routed between different legs of a mold for a multi-segment cable structure. At step 1106, a tube can be inserted into the mold to center the conductor bundle. For example, a tube having an internal diameter corresponding to dimensions of the conductor bundle, and an outer diameter corresponding to dimensions of each leg of the mold can be inserted in the mold. The conductor bundle can be threaded within the tube to center the conductor bundle relative to the mold. At step 1108, material can be injected into the mold. For example, material can be injected at a gate near a bifurcation region of the cable structure. At step 1110, the tube can be progressively removed ahead of a material front of the injected material. For example, an actuator can extract the tube from a leg of the mold as injected material reaches an end of the tube. In some cases, the tube can be absorbed by the injected material to form the cable structure. Process 1100 can end at step 1112.

Figure 12:
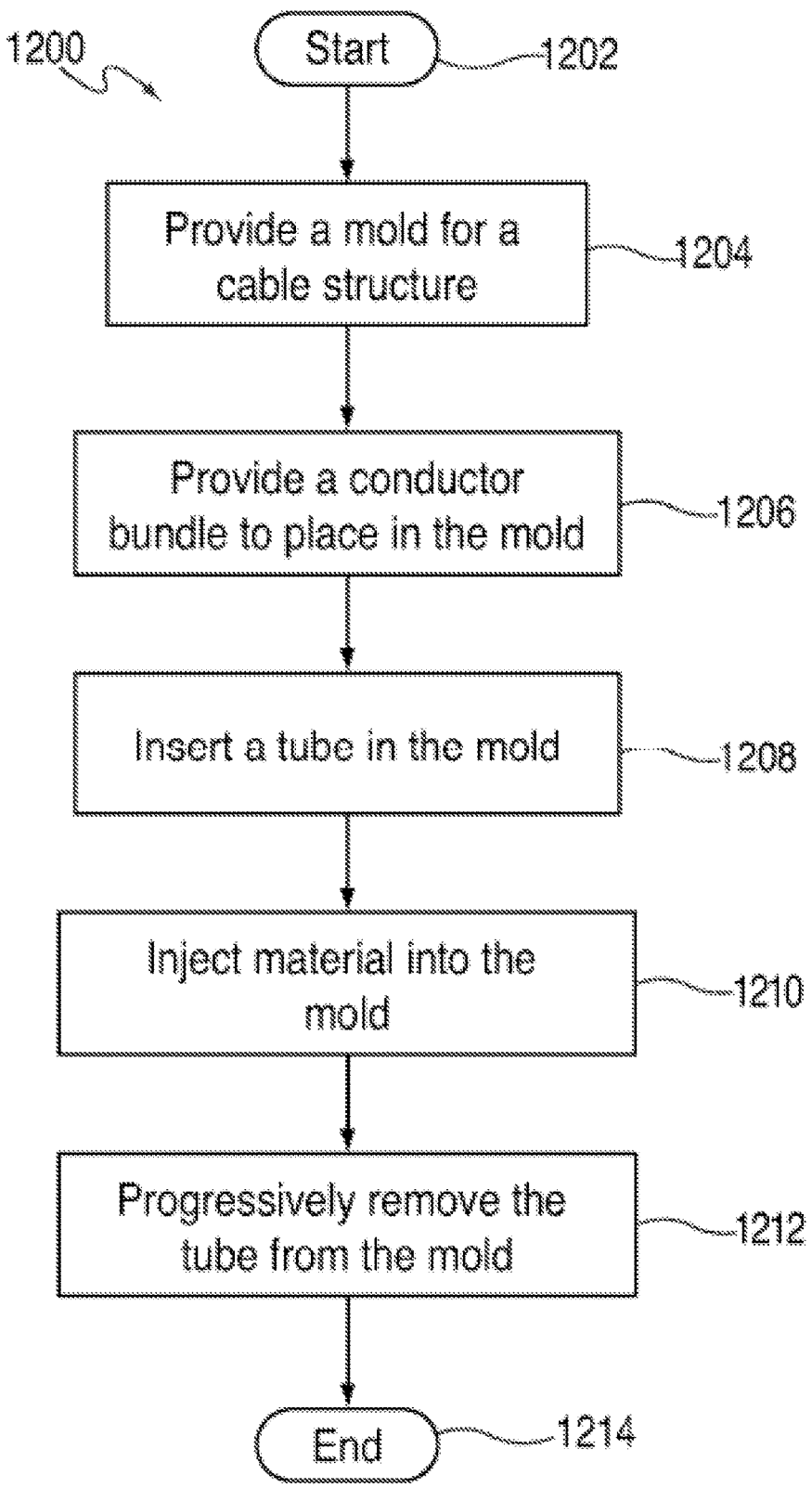
FIG. 12 is a flowchart of an illustrative process for centering a conductor bundle within a molded cable structure in accordance with some embodiments of the invention.

FIG. 12 is a flowchart of an illustrative process for centering a conductor bundle within a molded cable structure in accordance with some embodiments of the invention. Process 1200 can begin at step 1202. At step 1204, a mold for a cable structure can be provided. In some cases, the mold can define a cylindrical volume that includes at least one open end. At step 1206, a conductor bundle to place in the mold can be provided. Molded material injected into the mold can encapsulate the conductor bundle to form a cable structure. At step 1208, a tube can be inserted within the mold. The thickness of the tube wall can correspond substantially to a desired thickness of material enclosing the conductor bundle within the cable structure. At step 1210, material can be injected into the mold. For example, material can be injected into the mold through a gate. At step 1212, the tube can be progressively removed from the mold. For example, the tube can be removed as material is injected into the mold and reaches an end of the tube. Process 1200 can end at step 1214.

The previously described embodiments are presented for purposes of illustration and not of limitation. It is understood that one or more features of an embodiment can be combined with one or more features of another embodiment to provide systems and/or methods without deviating from the spirit and scope of the invention, and that the order of steps in a process are merely illustrative and can be changed.

What is claimed is:

1. A method for molding a cable structure, the method comprising:
   providing a length of a conductor bundle along a length of a mold, the mold comprising a center line;
   placing a first centering element of a plurality of centering elements at a first position about a periphery of the conductor bundle in a cross-section of the length of the conductor bundle, the cross-section being perpendicular to the center line;
   placing a second centering element of the plurality of centering elements at a second position about the periphery of the conductor bundle in the cross-section; and
   injecting material into the mold, wherein the plurality of centering elements is configured to center the cross-section of the conductor bundle on the center line of the mold during the injecting, and wherein at least one of the first centering element and the second centering element is configured to move along the length of the conductor bundle during the injecting.

2. The method of claim 1, wherein the placing the first centering element comprises placing the first centering element in contact with a first portion of the conductor bundle.

3. The method of claim 2, wherein the placing the second centering element comprises placing the second centering element in contact with a second portion of the conductor bundle.

4. The method of claim 3, wherein the first portion of the conductor bundle and the second portion of the conductor bundle are spaced between 60° and 180° apart about the periphery of the conductor bundle in the cross-section.

5. The method of claim 1, wherein the first centering element is configured to move along the length of the conductor bundle during the injecting, and wherein the second centering element is configured to move away from the conductor bundle during the injecting.

6. The method of claim 1, wherein the first centering element comprises a material front of the material from a gate.

7. The method of claim 6, wherein the second centering element comprises one of a removable pin and another material front of the material from another gate.

8. The method of claim 1, wherein the first centering element comprises a removable pin.

9. The method of claim 8, wherein the second centering element comprises a material front of the material from a gate.

10. The method of claim 1, wherein:
the first centering element is a first portion of a tube;
the second centering element is a second portion of the tube; and
the tube at least partially disappears upon contact with the material injected into the mold.

11. A method for molding a cable structure, the method comprising:
providing a conductor bundle in a mold;
placing a first centering element of a plurality of centering elements in contact with a first portion of the conductor bundle about a periphery of the conductor bundle in a cross-section of the conductor bundle;
placing a second centering element of a plurality of centering elements in contact with a second portion of the conductor bundle about the periphery of the conductor bundle in the cross-section of the conductor bundle; and
injecting material into the mold, wherein the plurality of centering elements centers the conductor bundle within the mold during the injecting, and wherein at least a portion of the second centering element disappears upon contact with the material injected into the mold.

12. The method of claim 11, wherein:
the mold comprises a center line; and
the cross-section of the conductor bundle is perpendicular to the center line.

13. The method of claim 11, wherein a portion of the first centering element is in contact with the first portion of the conductor bundle before the injecting.

14. The method of claim 13, wherein the portion of the first centering element comprises a surface that is shaped to match the shape of the first portion of the conductor bundle.

15. The method of claim 13, wherein the portion of the first centering element comprises a surface that is shaped to match the shape of a portion of an exterior surface of the cable structure.

16. The method of claim 11, wherein a portion of the first centering element moves away from the conductor bundle during the injecting.

17. The method of claim 11, wherein a portion of the first centering element disappears upon contact with the material injected into the mold.

18. A method for molding a cable structure, the method comprising:
providing a conductor bundle in a mold;
placing a first centering element of a plurality of centering elements in a first position about a periphery of the conductor bundle in a cross-section of the conductor bundle;
placing a second centering element of the plurality of centering elements in a second position about the periphery of the conductor bundle in the cross-section of the conductor bundle; and
once the first centering element and the second centering element are placed, injecting material into the mold, wherein the plurality of centering elements centers the conductor bundle within the mold during the injecting, and wherein at least a portion of the second centering element is configured to move along the length of the conductor bundle during the injecting.

19. The method of claim 18, wherein a portion of the first centering element moves outwardly away from the conductor bundle during the injecting.

20. The method of claim 18, further comprising controlling an action of the first centering element independently of an action of the second centering element during the injecting.

21. The method of claim 1, wherein:
the first centering element is a first portion of a tube;
the second centering element is a second portion of the tube; and
the tube surrounds the periphery of the conductor bundle in the cross-section of the length of the conductor bundle upon contact with the material injected into the mold.

22. The method of claim 1, further comprising controlling an action of the first centering element independently of an action of the second centering element during the injecting.

23. The method of claim 11, wherein:
the first centering element is a first portion of a tube;
the second centering element is a second portion of the tube; and
the tube surrounds the periphery of the conductor bundle in the cross-section of the length of the conductor bundle upon contact with the material injected into the mold.

24. The method of claim 11, wherein the portion of the second centering element comprises a centering element material that at least one of:
dissolves when the centering element material contacts the material injected into the mold;
vaporizes when the centering element material contacts the material injected into the mold; and
mingles when the centering element material contacts the material injected into the mold.

25. The method of claim 24, wherein:
the first centering element is a first portion of a tube;
the second centering element is a second portion of the tube; and
the tube surrounds the periphery of the conductor bundle in the cross-section of the length of the conductor bundle upon contact with the material injected into the mold.

26. The method of claim 18, wherein:
the first centering element is a first portion of a tube;
the second centering element is a second portion of the tube; and
once the first centering element and the second centering element are placed, the tube surrounds the periphery of the conductor bundle in the cross-section of the conductor bundle.

* * * * *